(12) United States Patent
Lederer et al.

(10) Patent No.: US 8,379,836 B2
(45) Date of Patent: Feb. 19, 2013

(54) METHOD, COMMUNICATION SYSTEM AND TERMINAL FOR ASSIGNING A KEY AND A DISPLAY FIELD OF A TERMINAL

(75) Inventors: Thomas Lederer, Herrsching (DE); Stephan Schaade, Buchloe (DE)

(73) Assignee: Siemens Enterprise Communications GmbH & Co. KG, Munich (DE)

( * ) Notice: Subject to any disclaimer, the term of this patent is extended or adjusted under 35 U.S.C. 154(b) by 1392 days.

(21) Appl. No.: 11/990,673

(22) PCT Filed: Jul. 24, 2006

(86) PCT No.: PCT/EP2006/064564
§ 371 (c)(1),
(2), (4) Date: Feb. 19, 2008

(87) PCT Pub. No.: WO2007/025804
PCT Pub. Date: Mar. 8, 2007

(65) Prior Publication Data
US 2009/0097636 A1   Apr. 16, 2009

(30) Foreign Application Priority Data
Aug. 31, 2005   (DE) .......................... 10 2005 041 367

(51) Int. Cl.
*H04M 1/00* (2006.01)
(52) U.S. Cl. .................. 379/355; 379/93.23; 379/142.06
(58) Field of Classification Search ............... 379/93.17, 379/93.23, 355.01, 355.02, 355.03, 355.05, 379/355.06, 142.01, 142.04, 142.06, 142.15, 379/142.17
See application file for complete search history.

(56) References Cited

U.S. PATENT DOCUMENTS

| 4,908,853 | A | * | 3/1990 | Matsumoto | 379/355.09 |
|---|---|---|---|---|---|
| 5,483,352 | A | * | 1/1996 | Fukuyama et al. | 358/402 |
| 5,511,115 | A | | 4/1996 | Bayerl et al. | |
| 5,734,706 | A | * | 3/1998 | Windsor et al. | 379/142.01 |
| 5,963,623 | A | * | 10/1999 | Kim | 379/100.01 |
| 6,104,807 | A | * | 8/2000 | Johnson et al. | 379/428.04 |
| 6,757,372 | B1 | * | 6/2004 | Dunlap et al. | 379/142.17 |
| 2003/0161450 | A1 | * | 8/2003 | Clapper | 379/88.21 |
| 2004/0141599 | A1 | * | 7/2004 | Tang et al. | 379/93.24 |
| 2004/0198329 | A1 | * | 10/2004 | Vasa | 455/414.1 |
| 2005/0108348 | A1 | | 5/2005 | Lee | |
| 2005/0250483 | A1 | * | 11/2005 | Malik | 455/415 |

FOREIGN PATENT DOCUMENTS

| EP | 0 808 049 A2 | 11/1997 |
|---|---|---|
| EP | 0 930 761 A2 | 7/1999 |
| EP | 1 220 518 A2 | 7/2002 |
| EP | 1 505 813 A2 | 2/2005 |
| WO | WO 98/48554 A1 | 10/1998 |
| WO | WO 02/39681 A1 | 5/2002 |

* cited by examiner

*Primary Examiner* — Olisa Anwah

(57) ABSTRACT

There is described a method, a system and a terminal for occupying a key and a display field, which is associated with the key, of a first end device of a first subscriber. An address identifies the second end device of a second subscriber, following user input of the first subscriber. The detected address is assigned to the key as a target address for setting up a future connection. Associated subscriber information is determined for the detected address, and the determined subscriber information is assigned to the display field.

7 Claims, 1 Drawing Sheet

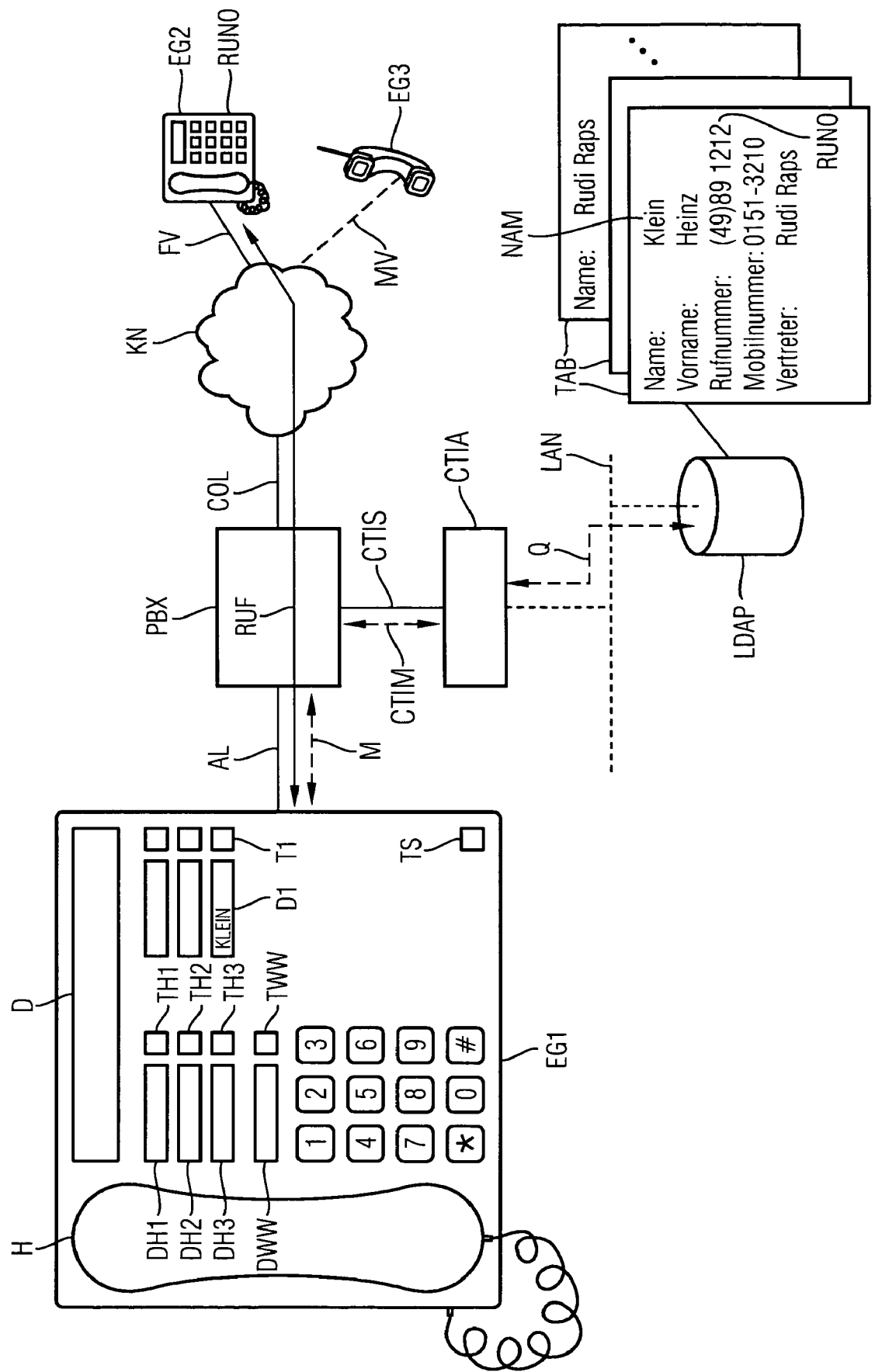

METHOD, COMMUNICATION SYSTEM AND TERMINAL FOR ASSIGNING A KEY AND A DISPLAY FIELD OF A TERMINAL

CROSS REFERENCE TO RELATED APPLICATIONS

This application is the US National Stage of International Application No. PCT/EP2006/064564, filed Jul. 24, 2006 and claims the benefit thereof. The International Application claims the benefits of German application No. 10 2005 041 367.6 DE filed Aug. 31, 2005, both of the applications are incorporated by reference herein in their entirety.

FIELD OF INVENTION

Most of the pushbutton telephones conventionally used in modern voice communication systems support the capability of assigning or programming function keys so that pressing a function key causes a connection to be established to a telephone number previously stored for the function key. Such function keys are frequently referred to as freely assignable keys, name keys, speed dialing keys or repertory dialing keys.

BACKGROUND OF INVENTION

It is often necessary for certain telephone-specific or switching system-specific operating steps to be performed in order to program a function key. The allocation of a programmed speed dialing key to a telephone number is usually indicated here by the user manually writing on a paper label strip of the telephone with a pen.

There are also modern telephones whose keys are assigned an LCD or LED display (LED: Light-Emitting Diode; LCD: Liquid Crystal Display) in each case, on which the stored telephone number of the programmed speed dialing key can be displayed as an electronic key label. Manual labeling of the keys is not required for such telephones. Function keys of this type with a display are often referred to as self-labeling keys.

In known communication systems, setting the display for a key is then carried out during programming of the function key. For instance, following programming of a speed dialing key, the telephone number allocated to the speed dialing key is displayed on the display for the speed dialing key. In addition, as part of programming the speed dialing keys, the user is often able to manually edit the electronic key label via a user interface, by entering a text or the name of the subscriber for the stored destination telephone number for example. This name can then be displayed on the display of the speed dialing key instead of the telephone number.

SUMMARY OF INVENTION

An object of the invention is to disclose a method by means of which assigning a function key and a display field of a terminal which is allocated to the function key is simplified. It is a further object of the invention to disclose a terminal and a communication system for carrying out the method.

This object is achieved by a method having the features of an independent claim, by a communication system and by a terminal.

Advantageous embodiments and developments of the invention are set out in the dependent claims.

In the method according to the invention for assigning a key and a display field of a first terminal which is allocated to the key, in which a communication connection is initiated between the first terminal of a first subscriber and a second terminal of a second subscriber, as a result of a user input of the first subscriber, an address that identifies the second terminal with respect to the communication connection is recorded. The recorded address is assigned to the key as the destination address for a future connection setup. Associated subscriber information is also automatically determined for the recorded address, and the determined subscriber information is assigned to the display field.

In particular the key here may be a speed dialing key, direct call key or redial key, while the display field allocated to the key may be an LED or LCD text array in particular. Terminals may preferably be a communication terminal, a telephone and/or a so-called soft client of a circuit-switched or packet-based communication system—in particular a real-time system for voice communications—in which a soft client represents a telephone application running on a data device. The address may in particular be a telephone number, while the subscriber information may preferably be a textual description of a telephone number—in particular a name of the subscriber of the second terminal.

The subscriber information may be extracted here in particular from signaling present in known communication systems, requested by the first terminal from a communication system controlling said terminal, and/or read out from a database.

The communication connection may in particular be an established connection starting from the first to the second terminal, an established connection starting from the second terminal to the first, as well as a communication connection still in the stage of establishing a connection between the first terminal and the second terminal.

The user input may in particular be either the selection of a function at the first terminal, for example a menu selection and/or a key press, or selection of a menu option or activating a pushbutton on a graphical user interface of a soft client or administration software allocated to the terminal.

The invention expediently permits quick and easy setting of a display field allocated to a key with substantially fewer steps requiring to be performed manually. In particular it is possible to avoid the input of alphabetic characters or special characters using a numeric input field with multiple assignments, which is frequently laborious on known terminals.

In one advantageous development of the invention, the subscriber information for the recorded communication system address can be determined by accessing a directory service, in particular using LDAP access (LDAP: Lightweight Directory Access Protocol). This is especially advantageous as it is often the case that companies store employee data such as name, telephone number, employee number, email address, etc. centrally in a database of a directory service and said data can be used as subscriber information. It is consequently possible to read out data from a database that was originally set up for another purpose. This reduces the configuration work involved and there is also less likelihood of errors being introduced as a result of outdated subscriber data or from error-prone manual maintenance of the subscriber data.

Access to the directory service can be effected here via the first terminal or via a central communication device such as a switching system or a gatekeeper.

It is furthermore known that it is often the case that terminals of employees of a firm or organization are controlled by networked communication devices, and information such as a name of the subscriber is usually only configured in one of the communication devices, and is consequently not always available to the first terminal. It is therefore advantageous that the interrogation of the directory service dispenses with the need for complex inter-communication device communication for determining the subscriber information.

The use of a directory service is additionally expedient because data records independent of the communication system may be present in the database of the directory service. In particular the data records of external company contacts or alternative subscriber telephone numbers such as mobile phone numbers that are not configured in the communication system can be stored in the database and consequently read out and utilized for labeling the display field.

In another advantageous development of the invention, the key can be multiply assigned, for example on two levels, with the second level being addressed and/or activated by a shift key. A second address can then be assigned to the key on the second level. Second subscriber information allocated to the second address can be assigned to the display field. Said second subscriber information can preferably be displayed as soon as the shift key is pressed. The assignment of the key and the display field can be performed here jointly for both levels by means of the user input.

In one advantageous embodiment of said development, on a first level of a key and of a display field, a configured telephone number of a subscriber in a communication system can be used, while a mobile phone number of the subscriber can be allocated to the second level of the key and of the display field.

In another advantageous development of the invention, the determined subscriber information can be assigned to the display field in editable form. In this case, the subscriber is able to edit the subscriber information at the terminal itself or in an application running on a computer. It is therefore possible, for example, in the case of a mobile phone number to manually append the character string "mobile" to the subscriber information in order to be able to distinguish between a mobile phone number and a fixed network number.

With the inventive method according to the coordinate claim 10 for assigning a display field allocated to a key of at least one terminal, for at least one key an assigned address of the respective key is recorded for the respective terminal. Associated further subscriber information is determined for the recorded assigned address, and the determined further subscriber information is assigned to a display field of the respective key.

It is consequently possible for subscriber information of many or all terminals in a communication system to be expediently updated. An automatic run can preferably be automated and performed regularly in order to ensure that the subscriber information is always updated even for name changes.

BRIEF DESCRIPTION OF THE DRAWING

An exemplary embodiment of the invention is described in greater detail below with reference to the drawing.

In a schematic representation,

FIG. 1 shows a communication system for carrying out the method according to the invention.

DETAILED DESCRIPTION OF INVENTION

FIG. 1 schematically illustrates a communication system for real-time communication with a switching system PBX represented as a rectangle and a first telephone EG1 as a first terminal, which is connected via an access line AL to the switching system PBX. A second telephone EG2 is also connected as a second terminal to the switching system PBX via a trunk line COL and via a communication network KN (stylized as a cloud). A telephone number RUNO is allocated as an address to the second telephone EG2. In addition, a third telephone EG3 with an allocated (not shown) second telephone number as a second address is connected to the communication network KN.

The access line AL for connecting the first telephone EG1 within a company network and the trunk line COL for connecting terminals (EG2, EG3) from outside the company network are shown as solid lines. A fixed network connection FV between the communication network KN and the second telephone EG2 is likewise shown as a solid line, while a mobile phone connection MV between the third telephone EG3 and the communication network KN is shown as a broken line.

The first telephone EG1 is a terminal of a first subscriber, while the second and the third telephone EG2, EG3 are terminals of a second subscriber.

Also connected to the switching system PBX is a CTI application CTIA (CTI: Computer Telephony Integration), and connected to the latter in turn is a directory service LDAP, represented as a cylinder. The CTI application CTIA and the directory service LDAP are internetworked here by means of a local area network LAN represented by a dashed line.

The CTI application CTIA and the switching system PBX are connected by means of a CTI interface CTIS which is shown as a solid line between these two components.

In FIG. 1 the first telephone EG1 is represented as a push-button telephone, with speed dialing keys T1, TH1, TH2, TH3, a redial key TWW and a shift key TS for accessing a second level for the speed dialing keys T1, TH1, TH2, TH3. An electronic display field is allocated to each of the speed dialing keys T1, TH1, TH2, TH3 and the redial key TWW. In this arrangement, a display field D1 is allocated to the speed dialing key T1, a display field DH1 is allocated to the speed dialing key TH1, a display field DH2 is allocated to the speed dialing key TH2, a display field DH3 is allocated to the speed dialing key TH3 and a display field DWW is allocated to the speed dialing key TWW. Associated display fields (shown as rectangles) and keys (shown as rectangles) are shown arranged directly next to one another in each case in FIG. 1. In addition, a telephone handset H and a telephone display D are shown in stylized form for the first telephone EG1.

Messages and data connections between the above-mentioned components are represented by broken double-arrow lines. These are in particular a keypress message M between the first telephone EG1 and the switching system PBX, a CTI message CTIM between the switching system PBX and the CTI application CTIA, and a query message Q of the CTI application CTIA to the directory service LDAP.

A circuit-based or packet-based voice communication connection RUF as the inventive communication connection between the first telephone EG1 and the second telephone EG2 via the switching system PBX is represented by a solid double arrow.

A subscriber table TAB of a database of the directory service LDAP is indicated by diagonally offset overlapping rectangles, with one rectangle representing a respective data record of the subscriber table TAB. By way of example a data record with the following data is shown in one of the rectangles:

Last name: Klein
First name: Heinz
Phone no.: (49)891212
Employee no.: 3210
Mobile no.: 0151-3210
Deputy: Rudi Raps It is also indicated in FIG. 1 that a further entry in the subscriber table TAB is configured for "Rudi Raps".

It is assumed that a data record exists in the subscriber table TAB of the directory service LDAP for each configured subscriber of the switching system PBX. It is also assumed that contacts external to the switching system, such as the subscriber "Heinz Klein" to whom the second telephone EG2 and the third telephone EG3 are allocated, are configured in the subscriber table TAB.

The starting situation in FIG. 1 is the voice connection RUF established between a first subscriber via their first telephone EG1 and a second subscriber with their second telephone EG2. During the voice connection RUF, or already during setting up of the voice connection RUF, the first subscriber decides to store the telephone number of the second telephone EG2 on the speed dialing key T1 in order to be able to dial the second subscriber more easily at a later time. To program the speed dialing key T1, the first subscriber presses the speed dialing key T1 in a terminal-specific way—e.g. by holding it down for several seconds or by previously selecting a terminal menu—and thus makes a user input on the first telephone EG1.

As a result of said user input by the first subscriber, the keypress message M is sent from the first telephone EG1 to the switching system PBX. A feature is then activated in the switching system PBX which causes the CTI message CTIM to be sent from the switching system PBX to the CTI application CTIA via the CTI interface CTIS. The CTI message CTIM preferably includes the recorded telephone number RUNO of the second telephone EG2 as the address RUNO identifying the second telephone EG2 of the voice connection RUF and any further switching system-specific and/or connection-specific data. The connection via the CTI interface CTIS is effected here in particular using the CSTA protocol (CSTA: Computer Supported Telecommunications Application) standardized by the ECMA (European Computer Manufacturers Association), by means of which the CTI application CTIA is notified about states and state changes of the switching system PBX.

The CTI application CTIA can run on a separate computer, in the switching system PBX, or on a workstation computer (not shown). The CTI application CTIA records the telephone number RUNO of the second telephone EG2 which was sent in the CTI message CTIM. In the present exemplary embodiment, this is the telephone number 089-1212.

In the next method step, the recorded telephone number RUNO is converted by the CTI application CTIA into a standardized format, e.g. as a so-called fully qualified telephone number, into a so-called canonical address format or into a format with country code, area code, system number and/or extension number. In the present exemplary embodiment this is (49)891212 for the telephone number RUNO of the second telephone EG2.

By interrogating said—possibly changed—telephone number RUNO using a query message Q, data associated with the recorded telephone number RUNO via the subscriber table TAB is read out by the directory service LDAP and returned to the CTI application CTIA. For the above data record, this is the name "Klein" as subscriber information NAM. It is also possible for a mobile phone number to be returned—"0151-3210" for the sample data record above—or the specification of a deputy for the subscriber ("Rudi Raps" is the deputy for "Heinz Klein" in the exemplary embodiment). It is also optionally possible to determine a telephone number and a name for the deputy.

The directory service LDAP is preferably based here on a database with a directory structure, with access being effected using the LDAP protocol. The database is preferably part of a so-called user management system which manages all the employees of a company—e.g. the first subscriber—as well as external contact persons—e.g. the second subscriber—centrally in the company network, and offers standardized access to said data using the LDAP protocol.

Once the CTI application CTIA has recorded the subscriber name NAM and optionally also the mobile phone number and deputy information, the CTI application CTIA sends said data, using acknowledgment messages for the aforesaid messages Q, CTIM and M, to the first telephone EG1 via the switching system PBX.

The first telephone EG1 thus obtains the name (NAM) of the second subscriber and, if not already done, also the telephone number RUNO from the switching system PBX, and now assigns the telephone number RUNO of the second telephone EG2 to the speed dialing key T1 as the destination address for a future connection setup, as well as the name NAM obtained to the display field D1 associated with the speed dialing key T1. The name NAM is then displayed on the display field D1.

By virtue of the aforesaid method steps, the programming of a speed dialing key and the assignment of a key display field are simplified and rendered less prone to error since fewer manual steps than usual are performed. Moreover, time is saved and efficiency is improved when assigning destination telephone numbers. In addition, the method may be optimally integrated in an existing workflow. Flexible options for extending the method are set out by way of example in the text below.

In an inventive extension, the speed dialing key T1 can be assigned to two or more levels using the shift key TS. In this case, in particular the second level can be automatically assigned in conjunction with the assignment of the first level. For instance, the aforesaid mobile phone number of the third terminal EG3 together with the name NAM of the second subscriber is sent by the CTI application CTIA to the first telephone EG1. In the first telephone EG1, the telephone number RUNO of the second terminal EG2 is stored on the first level of the speed dialing key T1 and the mobile phone number of the third terminal EG3 is stored on the second level. The name (NAM) of the second subscriber is allocated to the first level of the display field D1 and displayed. Furthermore, the name (NAM) of the subscriber is allocated to the second level of the display field, for example with the additional text "mobile", and is displayed when activated by the shift key TS.

In a further embodiment, a telephone number and the name of a deputy for the second subscriber is sent together with the name (NAM) of the second subscriber by the CTI application CTIA to the first terminal EG1. In FIG. 1 this is the subscriber "Rudi Raps". In turn, the telephone number (RUNO) of the second terminal EG2 is stored in the first telephone EG1 on the first level of the speed dialing key T1. The telephone number of the deputy is now sent to the second level. The name (NAM) of the second subscriber is allocated to the first level of the display field D1 and displayed. Furthermore, the name of the deputy is allocated to the second level of the display field, and is displayed when activated by the shift key TS.

In a generalized representation, different telephone numbers can be assigned to a plurality of levels of a key and a display field accordingly. For instance, it is possible for the telephone number RUNO of the second telephone EG2 to be stored on the first level of the key, the second telephone number of the third telephone EG3 to be stored on the second level of the key, and a telephone number of the deputy "Rudi Raps" to be stored on a third level. Accordingly, the character string "Heinz Klein" can be allocated to the display field on the first level, the character string "Heinz Klein mobile" can be allocated on the second level, and "Rudi Raps" can be allocated on a third level.

The redial key TWW and the associated display field DWW can be assigned analogously. The only difference from assigning the speed dialing key T1 and the display field D1 is that, in addition to the aforesaid mechanisms, the assignment of the redial key TWW can also be performed automatically as a result of a user input of the first subscriber, in that the termination of a connection, for example by replacing a telephone handset or by pressing a disconnect key, represents the user input.

In an extension of the method, the speed dialing keys TH1, TH2, TH3 can be assigned in such a way that they are automatically assigned destination telephone numbers for the most frequent connections from or to the first telephone EG1. This is analogous to a list of last opened files like that often offered by software applications. For instance, all the calls conducted in the switching system during a period of time can be logged and analyzed at the end of the period. In a so-called batch run, it is then possible for the respective speed dialing key and the respective display field to be set in accordance with the analysis for the three speed dialing keys TH1, TH2, TH3 and their respective display fields DH1, DH2, DH3 in accordance with the above-mentioned method steps, with the speed dialing key TH1 being assigned the telephone number of the most frequent communication partner, the speed dialing key TH2 being assigned the telephone number of the second most frequent communication partner and the speed dialing key TH3 being assigned the telephone number of the third most frequent communication partner.

In the present exemplary embodiment the telephones EG1, EG2, EG3 may be terminals or software telephone applications of the switching system PBX or switching system-external terminals. The expedient inclusion of switching system-external telephones is based on the fact that the subscriber table TAB can also be configured for the external telephone numbers of the external telephones. As a result, the number of cases in which subscriber information cannot be determined in the subscriber table TAB because a respective entry is missing is advantageously reduced.

Moreover, there is preferably a one-to-one allocation of a telephone number of a subscriber terminal to a subscriber and to their name in order to facilitate interrogation of the subscriber table TAB.

The method can furthermore be implemented in such a way that the subscriber information is displayed on the display field as a result of the user input according to the invention, as well as in an idle state of the terminal. In this case the display of the display field and the assignment of the key may apply only temporarily for these operating states, while another assignment of the key and of the display field can be activated as a result of another operating state, e.g. a connection being switched through. In this way the subscriber is always offered an optimum assignment of the keys adapted to the connection situation.

The display field can also be turned off in certain operating states in which selection of a speed dialing key is not appropriate.

While the invention was described in the exemplary embodiment with reference to a voice connection between two voice terminals, the communication connection may also be a video connection, a video conference or a similar connection between two or more communication partners.

As an alternative to the connection shown between the CTI application CTIA and the directory service LDAP, a terminal, in particular an IP-based terminal with a LAN interface, may be provided for establishing a direct connection to the directory service LDAP, for example over the local area network LAN. In this case key data for interrogating the directory service LDAP can be extracted directly from connection data and from message traffic from or to the terminal.

The invention claimed is:

1. A method for assigning a key and a display field of a first terminal allocated to the key, comprising:
   initiating a communication connection between the first terminal of a first subscriber and a second terminal of a second subscriber;
   recording an address identifying the second terminal with respect to the communication connection based upon a user input of the first subscriber;
   assigning the recorded address to the key as the destination address for a future connection setup;
   determining subscriber information associated to the recorded address;
   assigning the determined subscriber information to the display field; and
   assigning the address and the subscriber information to the key or the display field beyond the end of the communication connection; and
   wherein the key is assigned on a second level, wherein based upon the user input of the first subscriber an associated second subscriber information and an associated second address are determined for the recorded address, wherein the determined second address is assigned to the second level of the key as a second destination address for a future connection setup, and wherein the determined second subscriber information is assigned to the display field for the second level of the key.

2. A method for assigning a key and a display field of a first terminal allocated to the key, comprising:
   initiating a communication connection between the first terminal of a first subscriber and a second terminal of a second subscriber;
   recording an address identifying the second terminal with respect to the communication connection based upon a user input of the first subscriber;
   assigning the recorded address to the key as the destination address for a future connection setup;
   determining subscriber information associated to the recorded address;
   assigning the determined subscriber information to the display field; and
   assigning the address and the subscriber information to the key or the display field beyond the end of the communication connection;
   wherein the subscriber information for the recorded address is determined by accessing a directory service; and
   wherein the key is assigned on a second level, wherein based upon the user input of the first subscriber an associated second subscriber information and an associated second address are determined for the recorded address, wherein the determined second address is assigned to the second level of the key as a second destination address for a future connection setup, and wherein the determined second subscriber information is assigned to the display field for the second level of the key.

3. A method for assigning a key and a display field of a first terminal allocated to the key, comprising:

initiating a communication connection between the first terminal of a first subscriber and a second terminal of a second subscriber;
recording an address identifying the second terminal with respect to the communication connection based upon a user input of the first subscriber;
assigning the recorded address to the key as the destination address for a future connection setup;
determining subscriber information associated to the recorded address;
assigning the determined subscriber information to the display field; and
assigning the address and the subscriber information to the key or the display field beyond the end of the communication connection;
wherein the subscriber information for the recorded address is determined by accessing a directory service; and
wherein the directory service is accessed from the first terminal; and
wherein the key is assigned on a second level, wherein based upon the user input of the first subscriber an associated second subscriber information and an associated second address are determined for the recorded address, wherein the determined second address is assigned to the second level of the key as a second destination address for a future connection setup, and wherein the determined second subscriber information is assigned to the display field for the second level of the key.

4. The method as claimed in claim 1, wherein the recorded address is a fixed network address and the determined second address is a mobile communication address.

5. The method as claimed in claim 4, wherein a central communication device allocated to the first terminal updates a key memory for the key with the recorded address and the determined subscriber information.

6. The method as claimed in claim 4, wherein a workstation computer is allocated to the first terminal and the determined subscriber information assigned to the display field is displayed on an output unit of the workstation computer.

7. The method as claimed in claim 4, wherein the subscriber information assigned to the display field is output temporarily on the display field as a function of an operating state of the first terminal.

* * * * *